(12) United States Patent
Shimizu

(10) Patent No.: US 7,355,311 B2
(45) Date of Patent: Apr. 8, 2008

(54) ROTOR OF AXIAL GAP MOTOR AND METHOD OF PRODUCING SAME

(75) Inventor: Hirofumi Shimizu, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/143,486

(22) Filed: Jun. 3, 2005

(65) Prior Publication Data

US 2005/0285467 A1 Dec. 29, 2005

(30) Foreign Application Priority Data

Jun. 29, 2004 (JP) .............................. 2004-191967

(51) Int. Cl.
*H02K 21/12* (2006.01)
(52) U.S. Cl. ................................. 310/156.37; 310/268
(58) Field of Classification Search ...............................
310/156.32–156.37, 268, 261
See application file for complete search history.

(56) References Cited

U.S. PATENT DOCUMENTS

| | | | | |
|---|---|---|---|---|
| 4,143,288 A | * | 3/1979 | Sato | 310/66 |
| 4,982,130 A | * | 1/1991 | Cap et al. | 310/268 |
| 4,996,457 A | * | 2/1991 | Hawsey et al. | 310/268 |
| 5,118,978 A | * | 6/1992 | Matsumoto et al. | 310/153 |
| 5,789,841 A | * | 8/1998 | Wang | 310/179 |
| 6,002,193 A | * | 12/1999 | Canini et al. | 310/268 |
| 6,037,696 A | * | 3/2000 | Sromin et al. | 310/268 |
| 6,047,461 A | * | 4/2000 | Miura et al. | 29/598 |
| 6,323,573 B1 | * | 11/2001 | Pinkerton | 310/178 |
| 6,509,666 B1 | | 1/2003 | Huang et al. | |
| 6,943,473 B2 | * | 9/2005 | Furuse et al. | 310/112 |
| 2002/0158534 A1 | | 10/2002 | Fukunaga et al. | |
| 2004/0052671 A1 | | 3/2004 | Okuda | |

FOREIGN PATENT DOCUMENTS

| | | |
|---|---|---|
| EP | 1 292 004 A1 | 3/2003 |
| EP | 1 300 210 A2 | 4/2003 |
| GB | 1 436 980 | 5/1976 |
| JP | 2002-204559 A | 7/2002 |
| WO | WO 94/22204 A1 | 9/1994 |

* cited by examiner

*Primary Examiner*—Thanh Lam
(74) *Attorney, Agent, or Firm*—Foley & Lardner LLP

(57) ABSTRACT

A rotor of an axial gap motor has a circular rotor core. A circular frame member is put on one axial face of the circular rotor core. The frame member has a plurality of magnet receiving recesses that are circularly arranged about the axis of the circular frame member at evenly spaced intervals. A plurality of permanent magnets are received in the magnet receiving recesses. A connecting structure connects the circular rotor core and the circular frame member together.

4 Claims, 4 Drawing Sheets

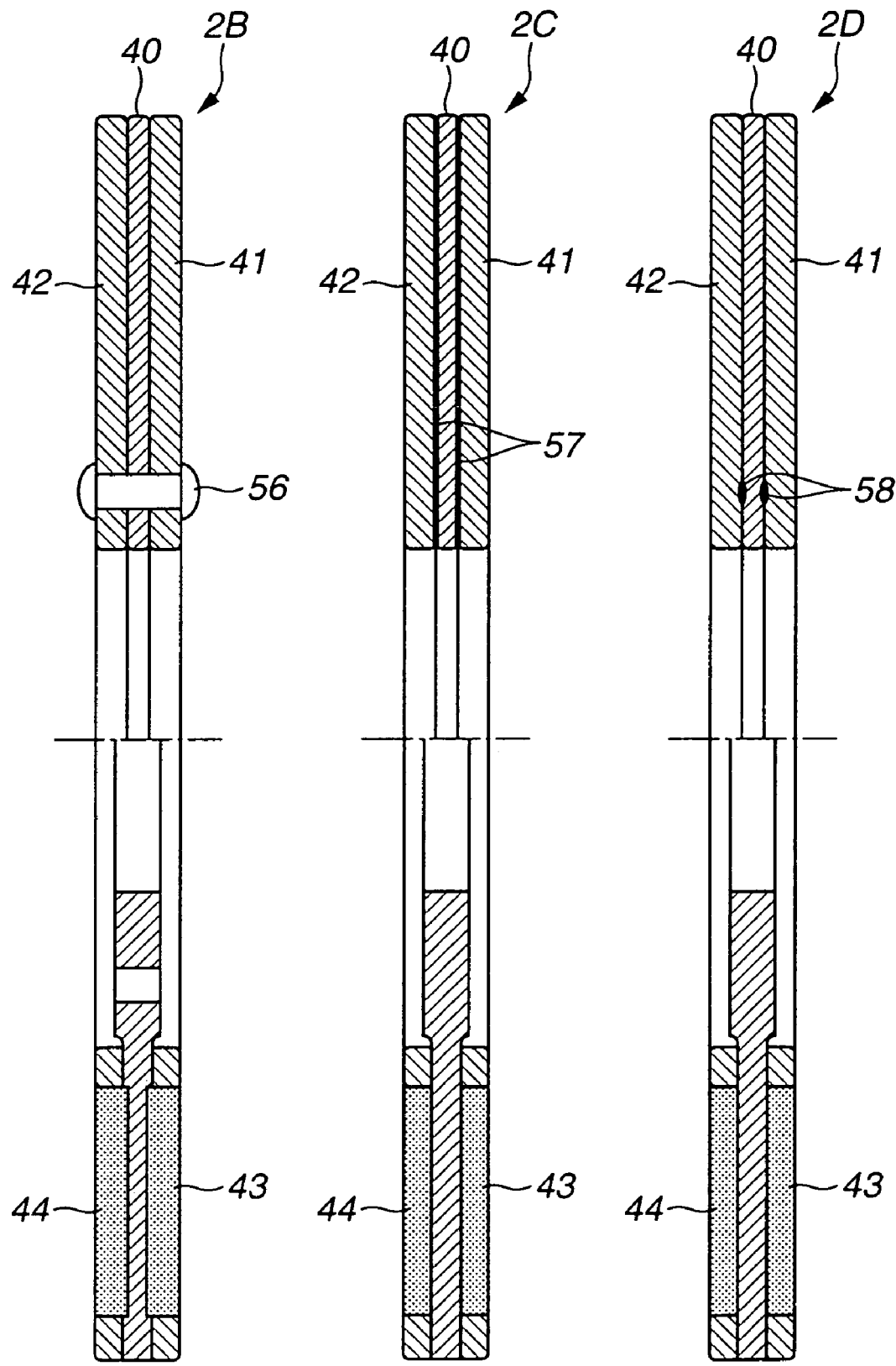

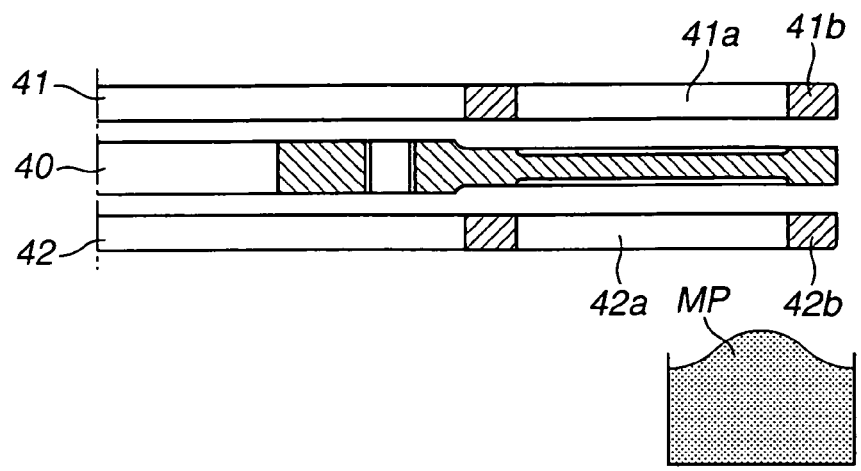
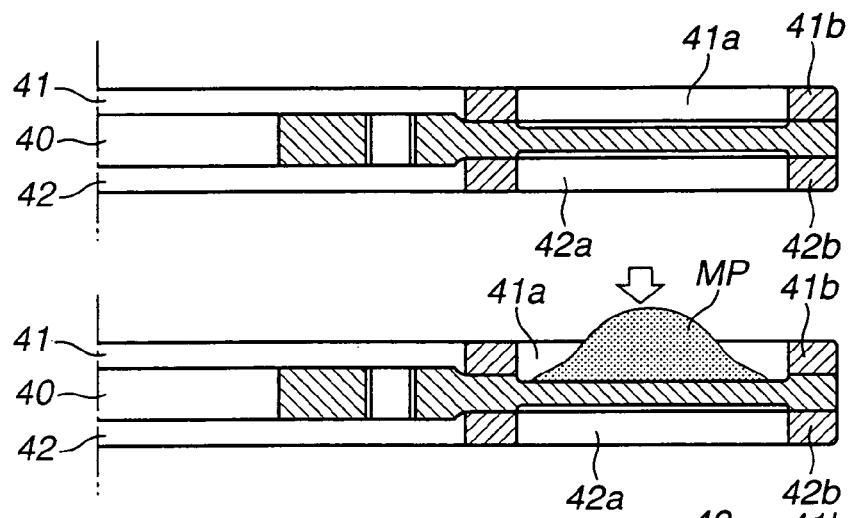
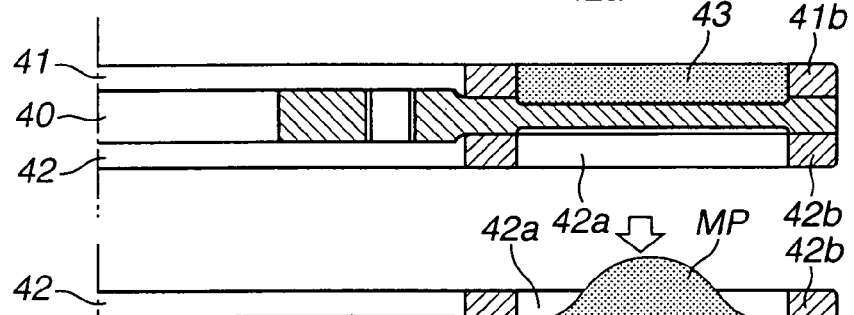
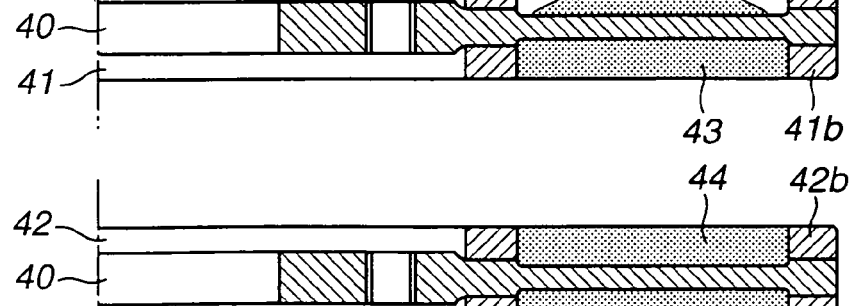
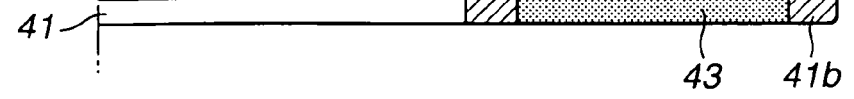

ROTOR OF AXIAL GAP MOTOR AND METHOD OF PRODUCING SAME

BACKGROUND OF THE INVENTION

1. Field of the Invention

The present invention relates in general to electric motors, and particularly to axial gap motors wherein a rotor and a stator are coaxially arranged leaving a certain gap therebetween. More specifically, the present invention relates to a rotor used in such axial gap motor and a method of producing the rotor.

2. Description of the Related Art

Hitherto, in the field of electric motor vehicles, hybrid motor vehicles and the like, various high power electric motors have been practically used, which are, for example, an interior permanent magnet synchronous motor (IPMSM) that has permanent magnets embedded in a rotor and a surface permanent magnet synchronous motor (SPMSM) that has permanent magnets placed on a surface of the rotor. Actually, because of practical usage of reluctance toque besides magnet torque, the above-mentioned motors, viz., IPMSM and SPMSM, can exhibit a high efficiency and thus a high output.

Some of the above-mentioned motors are of an axial gap type wherein a rotor and a stator are coaxially arranged leaving a certain gap therebetween. Due to its inherent construction, the motors of such axial gap type can have a thinner structure, viz., reduction in an axial length of entire construction of the motor, and thus such compact and powerful motors have been used as prime movers of the above-mentioned motor vehicles. One of such motors is shown in Japanese Laid-open Patent Application (Tokkai) 2002-204559.

SUMMARY OF THE INVENTION

Hitherto, for improving performance of the synchronous motors of the above-mentioned axial gap type, various attempts have been carried out particularly in the field of the electric motor vehicles and the hybrid type motor vehicles. However, such attempts have failed to exhibit satisfied results because of a difficulty in providing the magnets of the rotor with a satisfied magnetic force and a difficulty in providing a marked difference in saliency.

It is therefore an object of the present invention to provide a rotor of an axial gap type electric motor which can exhibit a satisfied magnetic force and a mechanical strength in spite of its thinner construction.

It is another object of the present invention to provide a method of producing a rotor of an axial gap electric motor.

In accordance with a first aspect of the present invention, there is provided a rotor of an axial gap motor, which comprises a circular rotor core; a circular frame member put on one axial face of the circular rotor core, the frame member having a plurality of magnet receiving recesses that are circularly arranged about the axis of the circular frame member at evenly spaced intervals; a plurality of permanent magnets received in the magnet receiving recesses; and a connecting structure that connects the circular rotor core and the circular frame member together.

In accordance with a second aspect of the present invention, there is provided a rotor of an axial gap motor with two stators, which comprises a circular rotor core; first and second circular frame members put on axially opposed faces of the circular rotor core, each frame member having a plurality of magnet receiving recesses that are circularly arranged about an axis of the circular frame member at evenly spaced intervals; a plurality of permanent magnets respectively received in the magnet receiving recesses of the first and second circular frame members, the permanent magnets on each frame member being arranged changing the magnetic N/S poles alternately; and a connecting structure that connects the circular rotor core and the first and second circular frame members together.

In accordance with a third aspect of the present invention, there is provided a method of producing a rotor for an axial gap motor with two stators, which comprises preparing a circular rotor core and two circular frame members, each frame member having a plurality of recesses which are circularly arranged about an axis of the frame member at equally spaced intervals; connecting the rotor core and the two frame members to constitute a united structure in which the two frame members are put on axially opposed faces of the rotor core; placing the united structure with one of the frame members facing upward; pouring a magnetic powder into the recesses of the frame member; subjecting the magnetic power in the recesses to a sintering thereby to produce sintered permanent magnets that are held in the recesses; turning the united structure upside down; pouring the magnetic powder into the recesses of the other frame member; and subjecting magnetic powder in the recesses to a sintering thereby to produce sintered permanent magnets that are held in the recesses.

BRIEF DESCRIPTION OF THE DRAWINGS

FIGS. 3A, 3B and 3C are sectional views of rotors of second, third and fourth embodiments of the present invention; and FIGS. 4A to 4F are sectional views showing steps for producing a rotor of the present invention.

DETAILED DESCRIPTION OF THE EMBODIMENTS

In the following, various embodiments of the present invention will be described in detail with reference to the accompanying drawings.

For ease of description, various directional terms, such as, right, left, upper, lower, rightward and the like are used in the following description. However, such terms are to be understood with respect to only a drawing or drawings in which a corresponding part or portion is shown. Throughout the description, substantially same parts and portions are denoted by the same numerals for easy understanding of the invention.

Figure 1:
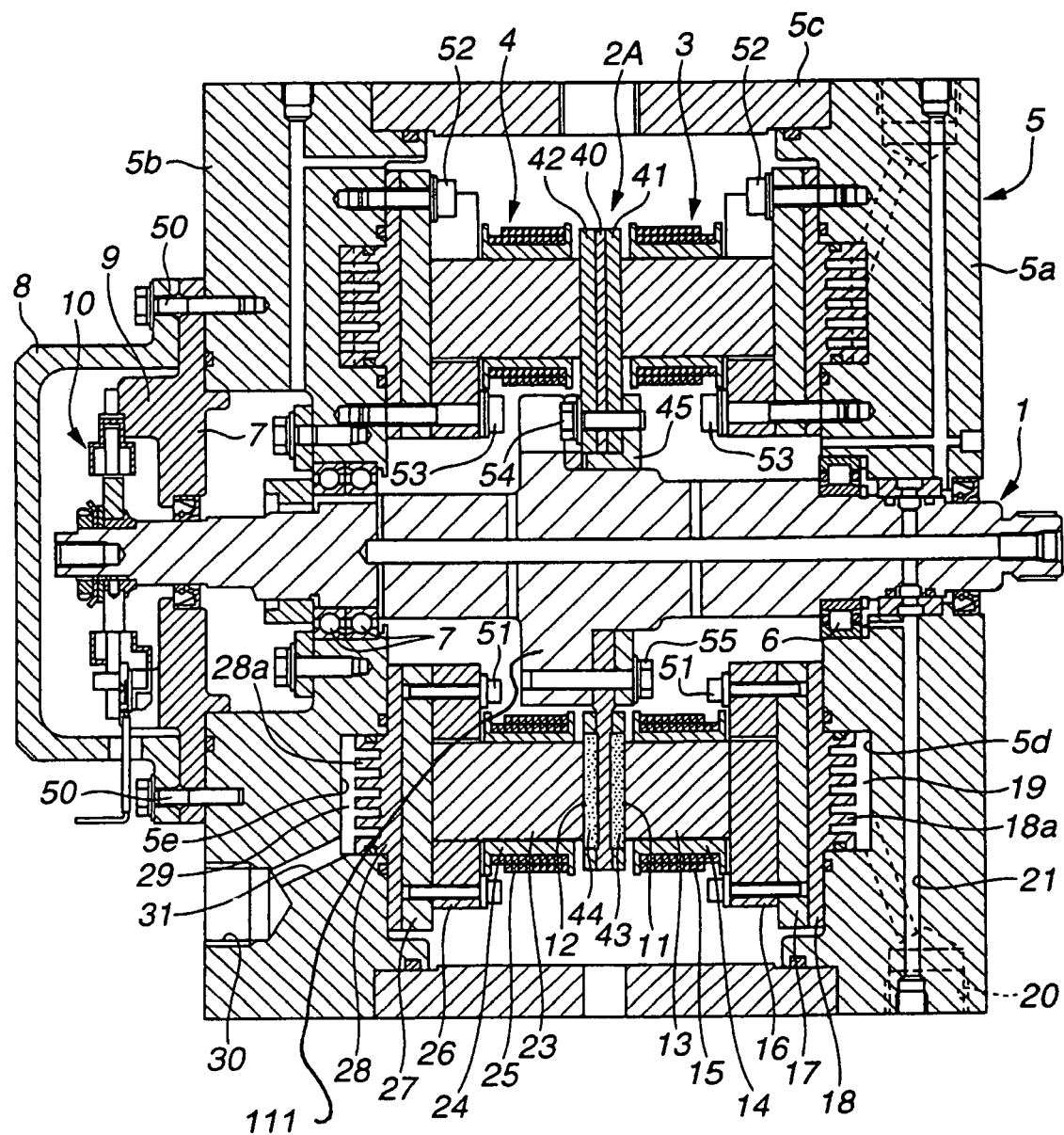
FIG. 1 is a sectional view of an axial gap type electric motor in which a rotor of a first embodiment is practically employed.

Referring to FIG. 1, there is shown an axial gap type electric motor 100 in which a rotor 2A of a first embodiment of the present invention is practically used.

Motor 100 comprises generally a rotor shaft 1, a rotor 2A, a first stator 3, a second stator 4 and a motor case 5. Motor case 5 comprises a circular front wall part 5a, a circular rear wall part 5b and a cylindrical wall part 5c sandwiched between circular front and rear wall parts 5a and 5b, as shown.

As shown, rotor shaft 1 extends axially in motor case 5 and rotates about its axis in motor case 5. That is, rotor shaft 1 has a right portion rotatably held by a first bearing 6 installed in circular front wall part 5a and a left portion rotatably held by a second bearing 7 installed in rear wall part 5a.

To rear wall part 5a of motor case 5, there are fixed a sensor cover 8 and a shaft cover 9 by means of connecting bolts 50. In a clearance defined between sensor cover 8 and shaft cover 9, there is installed a resolver-type speed sensor 10 that detects a rotation speed of rotor shaft 1. As shown, speed sensor 10 comprises an outer element fixed to shaft cover 9 and an inner element fixed to rotor shaft 1.

Rotor 2A is tightly mounted on a middle portion of rotor shaft 1 to rotate therewith.

As shown, first and second stators 3 and 4 are coaxially and stationarily arranged about rotor shaft 1 in a manner to put therebetween rotor 2A. Although not well shown, a certain clearance 11 or 12 is defined between each of stators 3 and 4 and rotor 2A.

As will be described in detail hereinafter, under energization of motor 100, first and second groups of permanent magnets 43 and 44 mounted on rotor 2A produce a counterforce against a rotating magnetic field provided by first and second stators 3 and 4, so that rotor 2A is forced to rotate together with rotor shaft 1. First and second groups of permanent magnets 43 and 44 are tightly and respectively mounted on right and left surfaces of rotor 2A at equally spaced intervals changing the magnetic poles (viz., N-pole and S-pole) alternately. The detail of rotor 2A will be described hereinafter.

First stator 3 is fixed to front wall part 5a of motor case 5 and comprises a first stator core 13, a first insulating member 14, a first stator coil 15, a first back core 16, a first core fixing plate 17 and a first core cooling plate 18.

First stator coil 15 is intimately put around first stator core 13 having first insulating member 14 intimately put therebetween. First stator core 13 has a split structure and is fixed to first back core 16. First insulating member 14 is an insulating sheet, an insulating paper or the like.

To fix first stator core 13 to front wall part 5a of motor case 5, the following technique is employed.

That is, first back core 16 to which first stator core 13 is fixed and first core fixing plate 17 are connected to each other by means of first connecting bolts 51, and then both first core fixing plate 17 and first core cooling plate 18 are connected to front wall part 5a by means of second connecting bolts 52, and both first back core 16 and first core fixing plate 17 are connected to front wall part 5a by means of third connecting bolts 53.

First core cooling plate 18 is formed with circularly arranged cooling fins 18a that are projected into an annular recess 5d formed in front wall part 5a of motor case 5. As shown, in annular recess 5d closed by first core cooling plate 18, there is defined a first coolant passage 19 that is communicated with a coolant inlet/outlet port 20 through a coolant passage 21, the port 20 and passage 21 being formed in front wall part 5a of motor case 5.

Second stator 4 is fixed to rear wall part 5b of motor case 5 and comprises a second stator core 23, a second insulating member 24, a second stator coil 25, a second back core 26, a second core fixing plate 27 and a second core cooling plate 28.

Second stator coil 25 is intimately put around second stator core 23 having second insulating member 24 intimately put therebetween. Second stator core 23 has a split structure and is fixed to second back core 26. Second insulating member 24 is an insulating sheet, an insulating paper or the like.

To fix second stator core 23 to rear wall part 5b of motor case 5, the following technique is employed.

That is, second back ore 26 to which second stator core 23 is fixed and second core fixing plate 27 are connected to each other by means of first connecting bolts 51, and then both second core fixing plate 27 and second core cooling plate 28 are connected to rear wall part 5b by means of second connecting bolts 52, and both second back core 26 and second core fixing plate 27 are connected to rear wall part 5b by means of third connecting bolts 53.

Second core cooling plate 28 is formed with circularly arranged cooling fins 28a that are projected into an annular recess 5e formed in rear wall part 5b of motor case 5. As shown, in annular recess 5e closed by second core cooling plate 28, there is defined a second coolant passage 29 that is communicated with a coolant inlet/outlet port 30 through a coolant passage 31, the port 30 and passage 31 being formed in rear wall part 5b of motor case 5.

Figure 2:
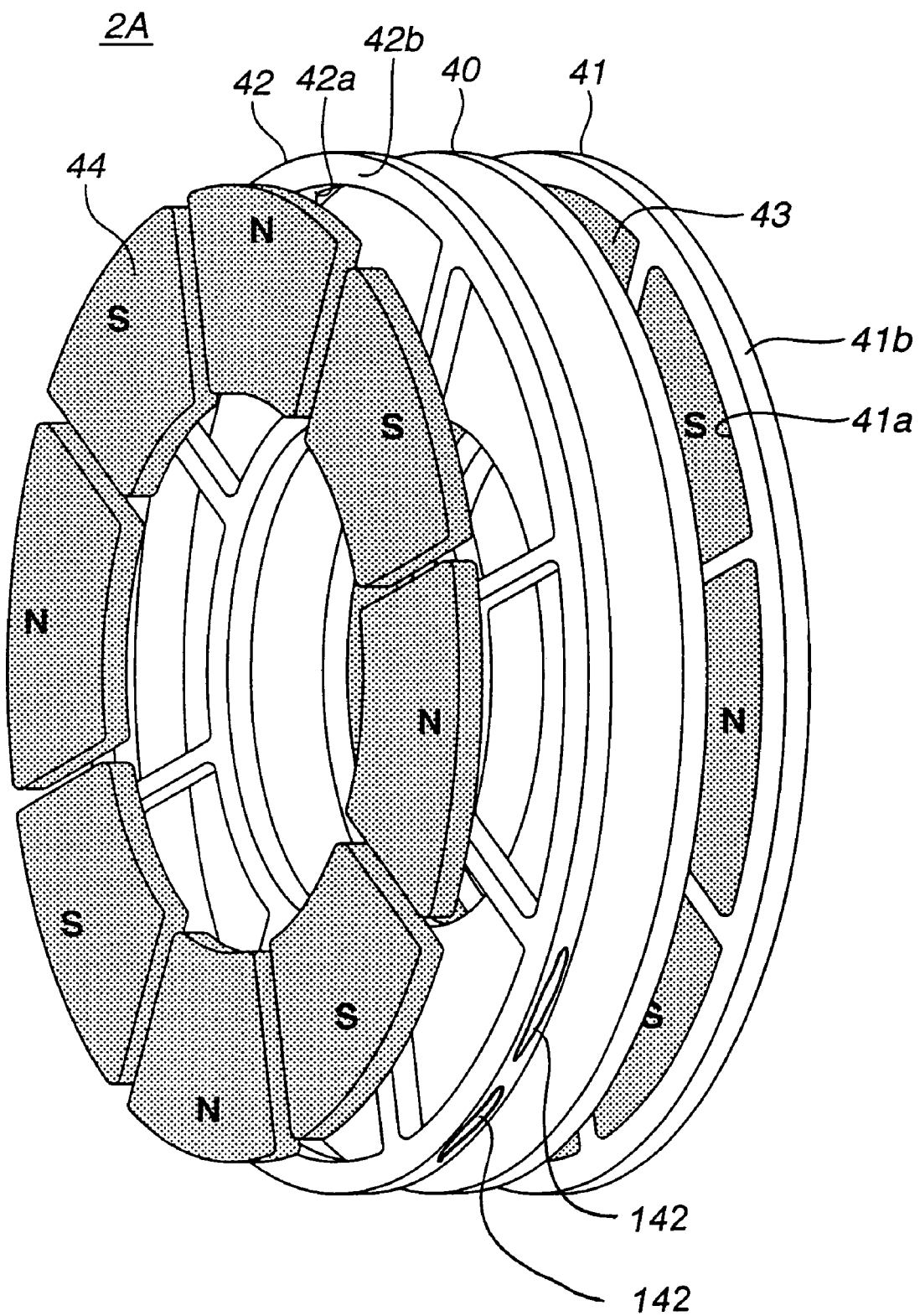
FIG. 2 is an exploded view of the rotor of the first embodiment, that is employed in the axial gap type electric motor of the first embodiment.

Referring to FIG. 2, there is shown in a broken manner rotor 2A of the first embodiment of the present invention.

As has been mentioned hereinabove, as is seen from FIG. 1, rotor 2A is tightly mounted on the middle portion of rotor shaft 1 to rotate therewith, and first and second stators 3 and 4 are coaxially and stationarily arranged about rotor shaft 1 in a manner to put therebetween rotor 2A.

Referring back to FIG. 2, rotor 2A has a circular rotor core 40 as a structural base thereof. First and second circular frame members 41 and 42 are intimately put on opposed surfaces of rotor core 40. First and second magnet receiving recesses 41a and 42a are formed in first and second frame members 41 and 42 respectively. As shown, each recess 41a or 42a has a trapezoidal shape with radially opposed edges slightly rounded. First and second groups of permanent magnets 43 and 44 are respectively and intimately received in magnet receiving recesses 41a and 42a. As shown, first and second groups of permanent magnets 43 and 44 are circularly arranged about an axis of rotor shaft 1 at equally spaced intervals. Permanent magnets 43 and 44 are of a so-called pre-magnetized type, that is, the type wherein magnetization of them is carried out before assembly of rotor 2A. More specifically, as will become apparent hereinafter, permanent magnets 43 and 44 are of a sintered type that is produced by sintering a magnetic powder.

Rotor core 40 is made of a magnetic material and first and second frame members 41 and 42 are made of a non-magnetic material. It is to be noted that a properly balanced rotation of rotor 2A about its axis is obtainable by cutting or shaving suitable portions of at least one of first and second frame members 41 and 42.

To secure rotor 2A to rotor shaft 1, the following technique is used.

That is, as is seen from FIG. 1, rotor core 40 and first and second frame members 41 and 42 are connected to a connecting ring 45 by means of first connecting bolts 54, and connecting ring 45 and rotor core 40 are connected to a diametrically enlarged portion 111 of rotor shaft 1 by means of second connecting bolts 55.

For assembling rotor 2A, at first, the essential parts, viz., rotor core 40, first and second frame members 41 and 42, and permanent magnets 43 and 44 are prepared. Then, as is seen from FIG. 2, permanent magnets 43 and 44 are tightly put into the recesses 41a and 42a of first and second frame members 41 and 42 respectively. Then, first and second frame members 41 and 42 are secured to the opposed surfaces of rotor core 40 assuring a relative position therebetween.

In the following, various advantages of rotor 2A of the first embodiment of the present invention will be described.

For clarifying the advantages of the invention, the disclosure of the above-mentioned Japanese Laid-open Patent Application (Tokkai) 2002-204559 will be briefly discussed at first.

As is described hereinabove, the published Application 2002-204559 discloses an axial gap type electric motor wherein a stator and a rotor are coaxially arranged in a manner to define therebetween a certain air gap. In the rotor employed in the motor, a plurality of permanent magnets are circularly arranged on one side surface of a circular hub alternating the magnetic poles (viz., N-pole and S-pole). However, due to insufficient magnetic power produced by the magnets on the hub, the motor has failed to produce a sufficiently high output power. Furthermore, due to difficulty in providing a marked difference in saliency, it is difficult to obtain a satisfied reluctance torque and thus, higher motor power has not been obtained from such motor.

In case of using a two-pole basic model of a three-phase Permanent Magnet Synchronous Motor (PMPS), magnet torque "Tm" and reluctance torque "Tr" are represented by the following equations.

$$Tm = Pn \cdot \Psi a \cdot Ia \cdot \cos \beta \quad (1)$$

$$Tr = (Pn/2)(Lq-Ld) \cdot Ia^2 \cdot \sin 2\beta \quad (2)$$

wherein:
Pn: number of pole pairs
Ψa: flux linkage by permanent magnet
Ia: amplitude of current vector
β: phase
Lq: q-axis inductance
Ld: d-axis inductance In the above-mentioned known axial gap type electric motor, the permanent magnets used are of a so-called post-magnetized type, that is, the type wherein magnetization of them is carried out after assembly of the rotor. Thus, the flux linkage "Ψa" fails to have a certain high level, and thus, as is understood from the equation (1), a higher magnet torque "Tm" is not obtained. Furthermore, since the permanent magnets are arranged on only one side surface of the hub, the magnet torque "Tm", that depends on the flux linkage "Ψa", fails to exhibit a higher level.

As is understood from the equation (2), the reluctance torque "Tr" largely depends on the difference between the q-axis inductance and the d-axis inductance, viz., the difference in saliency. However, in the known motor disclosed by the published Application, the magnets used are of a ring shaped permanent type and the motor is of the surface permanent magnetic synchronous motor (SPMSM) type wherein steel plates are not exposed to the outside at both ends of the magnets. Thus, the motor is of a non-salient pole machine that shows only a small difference between the q-axis inductance and the d-axis inductance.

While, in the axial gap type electric motor 100 that employs the rotor 2A of the first embodiment of the invention, due to the unique construction of rotor 2A as described hereinabove, the motor 100 can output a satisfied power. That is, rotor 2A is constructed to exhibit a satisfied mechanical strength against rotation in spite of its reduced thickness, and constructed to allow the associated electric motor 100 to output a higher power. As is described hereinabove, rotor 2A comprises rotor core 40, first and second frame members 41 and 42 put on the opposed surfaces of rotor core 40, front and rear magnet receiving recesses 41a and 42a defined in first and second frame members 41 and 42 respectively, and first and second groups of permanent magnets 43 and 44 respectively received in the magnet receiving recesses 41a and 42a.

As is understood from FIGS. 1 and 2, under rotation of rotor 2A, a centrifugal force applied to permanent magnets 43 or 44 is assuredly supported by both rotor core 40 and frame member 41 or 42 which are connected by first connecting bolts 54. Thus, the thickness of rotor core 40 and that of frame member 41 or 42 (more particularly, the thickness of a peripheral edge 41b or 42b of frame member 41 or 42) can be reduced. This means that the permanent magnets 43 and 44 used for rotor 2A can have a larger size. Thus, the magnet torque "Tm", that is proportional to the flux linkage "Ψa" of the large-sized permanent magnets 43 and 44, is expected to be high.

As is understood from FIG. 1, upon assembly of motor 100, rotor 2A is so arranged that permanent magnets 43 held by first frame member 41 faces first stator 3 and permanent magnets 44 held by second frame member 42 face second stator 4. That is, rotor 2A of the first embodiment is of a double-face type and practically used in a motor that has two stators. As is known, employment of a larger number of magnets brings about a higher power of the motor.

First and second frame members 41 and 42 are constructed of a non-magnetic material, and thus, undesired leakage of magnaflux of the magnets 43 and 44 is suppressed or at least minimized. Because of the same reason, shavings inevitably produced when frame members 41 and 42 are cut or shaved (see, for example, shaved areas 141 of frame member 42, depicted in FIG. 2) for achieving a properly balanced rotation of rotor 2A are prevented from sticking to permanent magnets 43 and 44.

Rotor core 40 is constructed of a magnetic material, and thus, the passage of magnaflux between first and second groups of permanent magnets 43 and 44 is smoothly carried out. That is, rotor core 40 and magnets 43 and 44 serve as a monolithic magnet.

As is known, when the two frame members 41 and 42 are constructed of a non-magnetic material, high difference in saliency is not obtained, and thus, improvement in output power of the motor 100 by the reluctance torque "Tr" is not expected. However, if rotor core 40 and first and second frame members 41 and 42 are all constructed of a magnetic material, a rotor would be provided that is similar to a rotor employed in an interior permanent magnet synchronous motor (IPMSM) wherein the permanent magnets are embedded in the rotor. In this motor, high difference in saliency is obtained and thus improvement in output power of the motor by the addition of reluctance toque "Tr" to magnet torque "Tm".

In the following, the advantages of rotor 2A of the present invention will be summarized in order.

First, the thickness of rotor 2A can be reduced while satisfying the mechanical strength thereof against rotation.

Second, a motor having rotor 2A operatively installed therein can exhibit a higher output performance.

Third, first and second frame members 41 and 42 are constructed of a non-magnetic material, and thus, undesired leakage of magnaflux of the magnets 43 and 44 is suppressed or at least minimized.

Fourth, rotor core 40 is constructed of a magnetic material, and thus, the passage of magnaflux between first and second groups of permanent magnets 43 and 44 is smooth carried out, and thus due to the high flux linkage "Ψa", a higher magnet torque "Tm" is obtained.

Fifth, first and second frame members 41 and 42 are constructed of a non-magnetic material, and thus, shavings inevitably produced when frame members 41 and 42 are cut or shaved for achieving a properly balanced rotation of rotor 2A are prevented from sticking to permanent magnets 43 and 44.

Sixth, because of usage of first and second connecting bolts 54 and 55 for integrating rotor core 40, first and second frame members 41 and 42 and connecting frame 45, rotor 2A is tightly fixed to rotor shaft 1.

Seventh, because permanent magnets 43 and 44 are of the pre-magnetized type, the flux linkage produced by such magnets 43 and 44 exhibits a certain high level, and thus, a higher magnet torque is obtained, which allows the motor 100 to exhibit a higher output performance.

Referring to FIGS. 3A, 3B and 3C, there are shown rotors 2B, 2C and 2D of second, third and fourth embodiments of the present invention.

In these embodiments 2B, 2C and 2D, connection of frame members 41 and 42 to rotor core 40 is made by means other than connecting bolts.

That is, in the second embodiment 2B of FIG. 3A, rivets 56 are used for such connection.

In the third embodiment 2C of FIG. 3B, brazing or welding is used for such connection. Denoted by numeral 57 is the zone where the brazing or welding is practically applied.

In the fourth embodiment 2D of FIG. 3C, spot welding is used for such connection. Denoted by numeral 58 is the zone where such spot welding is practically applied.

In the following, a method of producing a rotor, for example, rotor 2A of the first embodiment of the present invention will be described with reference to FIGS. 4A to 4F.

First, as is seen from FIG. 4A, rotor core 40, two frame members 41 and 42 and a magnetic powder MP are prepared.

Then, as is seen from FIG. 4B, frame members 41 and 42 are respectively put on opposed surfaces of rotor core 40 while assuring mutual positioning therebetween and tightly united is together by means of first connecting bolts 54 (see FIG. 1).

Then, as is seen from FIG. 4C, the magnetic powder MP is poured into magnet receiving recesses 41a of one frame member 41, then smoothed and compressed.

Then, as is seen from FIG. 4D, the magnetic powder MP is subjected to sintering process. With this, solid permanent magnets 43 are produced in the respective magnet receiving recesses 41a, so that a semi-finished product for rotor 2A is produced.

Then, as is seen from FIG. 4E, after turning the semi-finished product upside down, the magnetic powder MP is poured into magnet receiving recesses 42a of the other frame member 42, then smoothed and compressed.

Then, as is seen from FIG. 4F, the magnetic powder MP is subjected to sintering process. With this, solid permanent magnets 44 are produced in the respective magnet receiving recesses 42a, so that production of rotor 2A is completed.

The entire contents of Japanese Patent Application 2004-191967 filed Jun. 29, 2004 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A rotor of an axial gap motor with two stators arranged to accept the rotor therebetween, comprising:
   a circular rotor core;
   first and second circular frame members put on axially opposed faces of the circular rotor core, each frame member having a plurality of magnet receiving recesses that are circularly arranged about an axis of the circular frame member at evenly spaced intervals;
   a plurality of permanent magnets respectively received in the magnet receiving recesses of the first and second circular frame members, the permanent magnets on each frame member being arranged changing the magnetic N/S poles alternately; and
   a connecting structure that connects the circular rotor core and the first and second circular frame members together,
   wherein the connecting structure comprises:
   first connecting bolts passing through the rotor core and the first and second frame members for connecting the same together, the first connecting bolts being secured to a connecting ring that is adapted to be mounted on a rotor shaft of the axial gap motor; and
   second connecting bolts that pass through the rotor core and the connecting ring and are secured to a raised portion of the rotor shaft.

2. A rotor as claimed in claim 1, in which the circular rotor core is made of a magnetic material and the first and second circular frame members are made of a non-magnetic material.

3. A rotor as claimed in claim 2, in which at least one of the first and second circular frame members is partially cut or shaved to obtain a properly balanced rotation of the rotor relative to the stators of the motor.

4. A rotor of an axial gap motor with two stators, comprising:
   a circular rotor core of a magnetic material;
   first and second circular frame members of a non-magnetic material, the first and second circular frame members being put on axially opposed faces of the circular rotor core, each frame member having a plurality of magnet receiving recesses that are circularly arranged about an axis of the circular frame at equally spaced intervals;
   a plurality of permanent magnets respectively received in the magnet receiving recesses of the first and second circular frame members, the permanent magnets on each frame member being arranged changing the magnetic N/S poles alternately, the permanent magnets being of a sintered type; and
   a connecting structure that connects the circular rotor core and the first and second circular frame members together, wherein the connecting structure comprises either one of a brazed portion and welded portion by which the rotor core is secured to the first and second frame members.

* * * * *